Figure 2:
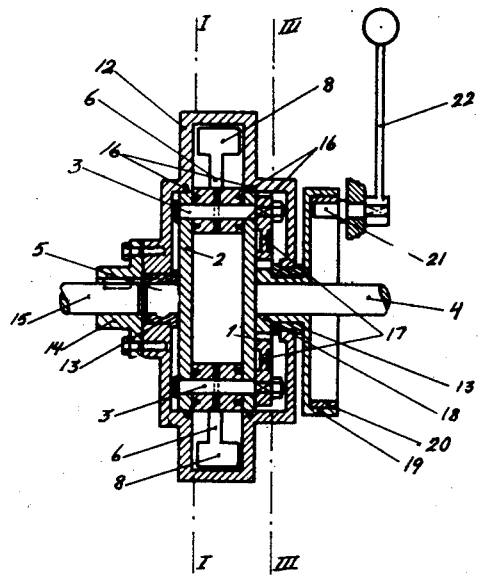

Oct. 17, 1933.   C. A. RUDQVIST   1,931,209
POWER TRANSMISSION
Filed July 14, 1931   4 Sheets-Sheet 1

Inventor:
C. Rudqvist

Oct. 17, 1933.   C. A. RUDQVIST   1,931,209
POWER TRANSMISSION
Filed July 14, 1931   4 Sheets-Sheet 2

Inventor:
C. Rudqvist

Oct. 17, 1933.  C. A. RUDQVIST  1,931,209
POWER TRANSMISSION
Filed July 14, 1931  4 Sheets-Sheet 3
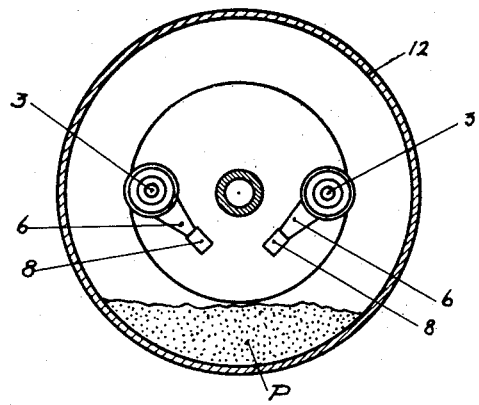
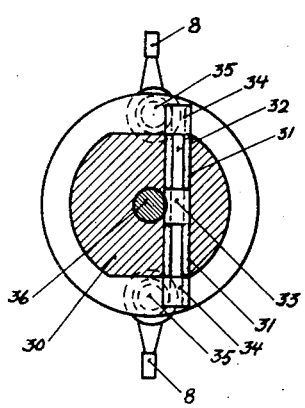
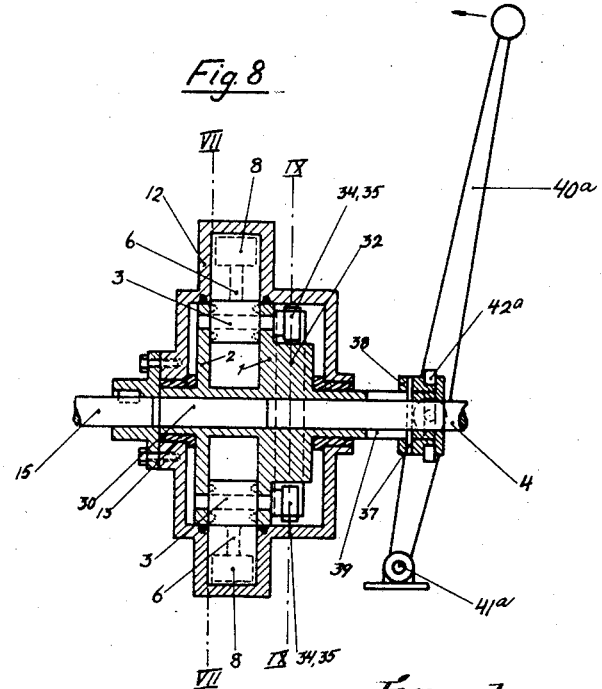
Inventor:
C. Rudqvist Oct. 17, 1933.  C. A. RUDQVIST  1,931,209
POWER TRANSMISSION
Filed July 14, 1931  4 Sheets-Sheet 4

Inventor.
C. Rudqvist

Patented Oct. 17, 1933

1,931,209

UNITED STATES PATENT OFFICE 1,931,209

POWER TRANSMISSION

Carl August Rudqvist, Lidingo, Sweden

Application July 14, 1931, Serial No. 550,731, and in Sweden November 12, 1930

6 Claims. (Cl. 192—58)

My present invention relates to power transmission between co-axially mounted relatively rotatable driving and driven parts, e. g. a power engine and a working engine, and more particularly to power transmission mechanisms or clutches for this purpose in which a mass of loose material or powder is used as transmitting medium between the parts, the one element of the clutch consisting of a casing or the like connected to one of said parts and enclosing said loose material or powder, whereas the other element of the clutch comprises one or more members or blades arranged within the casing and movably connected to the other of the parts in such a manner as to be angularly displaceable in a plane perpendicular to the axis of rotation.

The principal object of my invention is to provide a clutch of the above said type having means permitting the clutch to be thrown into and out of engagement, when being at rest as well as during operation.

Another object of my invention is to provide a clutch of the above mentioned type in which the means of throwing the clutch into and out of engagement also permits variation of the slipping torque of the clutch, the position of angular displacement of the members or blades being operatively controlled.

These and other objects of my invention will be apparent from the following specification reference being had to the accompanying drawings which show, by way of example, several embodiments of the invention.

In the drawings:—

Figure 1:
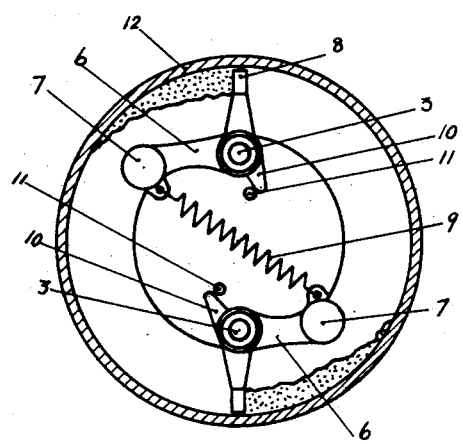
Figure 3:
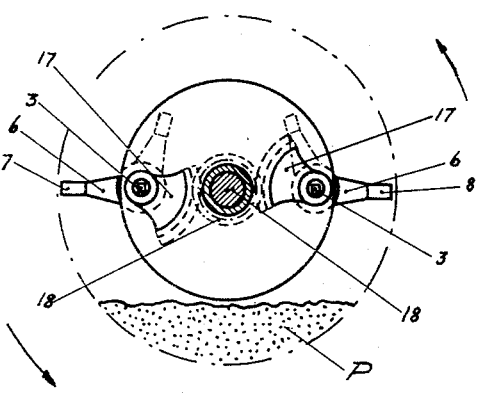

Figs. 1 to 3, inclusive, show a first embodiment, Fig. 1 being a cross section along the line I—I in Fig. 2 which shows an axial section of the clutch, whereas Fig. 3 is a cross section along the line III—III in Fig. 2.

Figure 4:
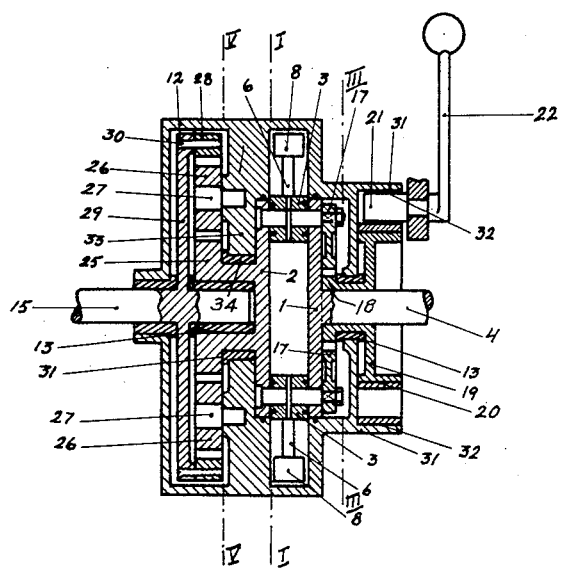
Figure 6:
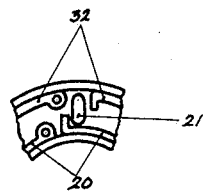
Figure 5:
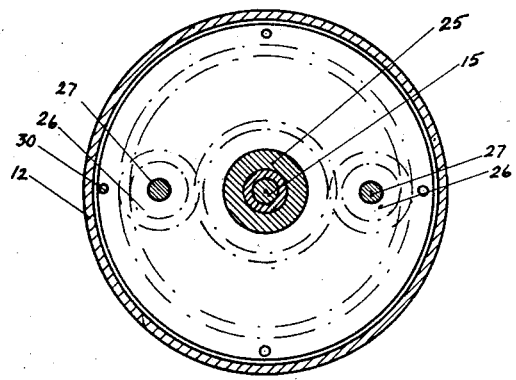

Figs. 4 to 6, inclusive, show a second embodiment which is a further development of the first one permitting also reverse of the direction of rotation of the driven part. Fig. 4 is an axial section of this embodiment, Fig. 5 a cross section along the line V—V in Fig. 4 and Fig. 6 a partial view of a braking device belonging to the reversing device. The sections along lines I—I and III—III in Fig. 4 correspond to those shown in Figs. 1 and 3, respectively.

Figs. 7 to 9, inclusive, show a third embodiment, Fig. 7 being a cross section along the line VII—VII in Fig. 8 which shows an axial section of the clutch, whereas Fig. 9 is a cross section along the line IX—IX in Fig. 8. The blades are shown in their position of rest in Fig. 7 and in operating position in Fig. 9.

Figure 10:
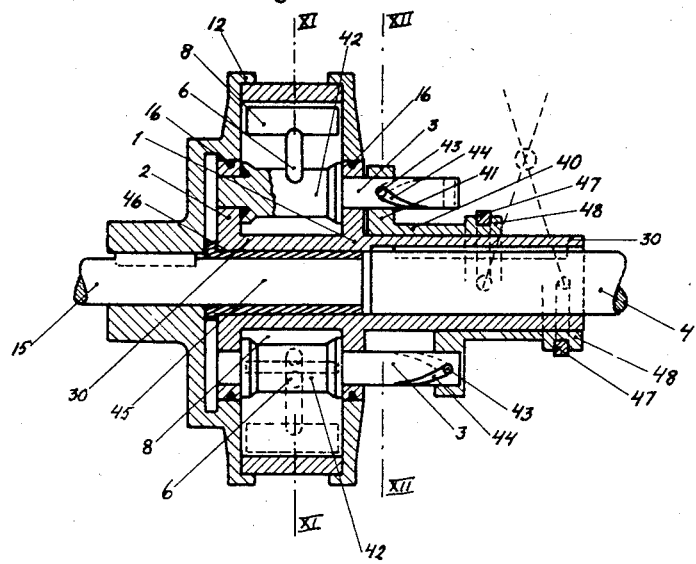
Figure 12:
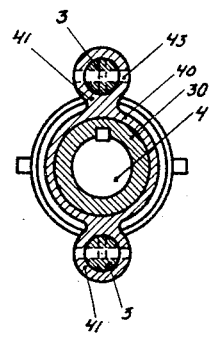
Figure 11:
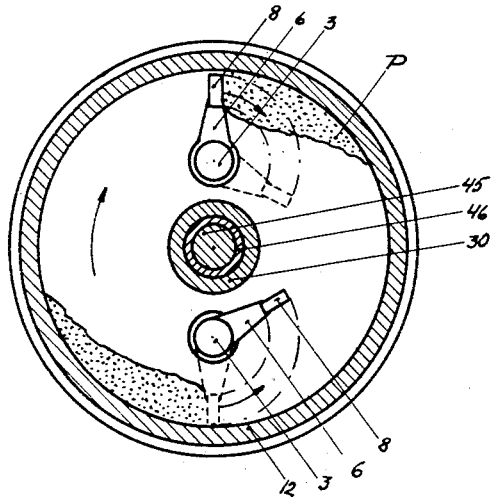

Figs. 10 to 12, inclusive, show a fourth embodiment. Fig. 10 is an axial section of the clutch which in the upper half of the figure is shown in engaged and in the lower half in disengaged position. Figs. 11 and 12 are cross sections along the lines XI—XI and XII—XII in Fig. 10, respectively.

Figure 13:
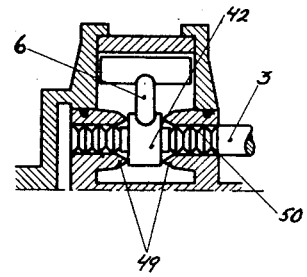

Fig. 13 illustrates a modification of the clutch shown in Figs. 10 to 12, inclusive.

In the clutch shown in Figs. 1 to 3, inclusive, the one element of the clutch, e. g. the driving one, consists of a pair of flanges 1, 2 connected with each other by bolts 3, 3. Flange 1 is supported by the driving shaft 4, flange 2 by a pivot 5. Secured to bolts 3, 3 are swinging arms 6, 6 consisting, in the embodiment shown, of bell crank levers, the one arm of which forms a weight 7, whereas the other arm is formed to a blade 8 or the like (see Fig. 1). The arms 6, 6 are connected with each other by a spiral spring 9. Tails 10 on the arms co-operate with abutments 11 on flange 2 to limit the outermost position of the swinging arms.

The other element of the clutch, thus the driven one, consists of a casing or drum 12 supported by bearings 13, 13 and rigidly connected by means of a flange 14 with the driven shaft 15 mounted co-axially to shaft 4. The casing is wholly or partially filled by a powder or loose material P. The terms "powder" and "solid loose material" used in this specification and the following claims are intended to cover any mass of more or less finely divided particles, as for instance a proper powder or small balls of steel or any other metal or solid suitable material. In order to prevent the material from leaking out from the casing 12 annular packings are provided as shown at 16, 16.

In order to permit engagement and disengagement of the clutch as well as adjustment of the angular position of the blades 8 the bolts 3, 3 are, in this embodiment, each provided with a toothed segment 17 outside flange 1 (see Fig. 3), said toothed segments engaging a common toothed wheel 18 rigidly connected or formed integral with a brake drum 19. A braking band 20 co-operating with said drum 19 is controlled in known manner by a stretching device 21 and a hand lever 22.

In the position of rest the swinging arms 6, 6 occupy the position shown in dotted lines in Fig. 3, the loose material or powder P being collected in the lowermost portion of casing 12. When shaft 4 is set in rotation, the arms 6, 6 will have a tendency, under the action of centrifugal force acting particularly on weights 7, to take up the position shown in full lines in the figures. During the period of acceleration the blades 8, 8 will move successively outwards, engaging gradually the loose material P which successively brings with it casing 12 and shaft 15 in a manner known per se. The time of acceleration of the clutch, i. e. the time required for attaining direct drive condition, is dependent on the tension of spring 9 and the magnitude of powder filling.

Supposing that the clutch is operating normally and that it is desired to stop shaft 15 without interrupting the rotation of shaft 4, this will be effected by tightening braking band 20 by turning lever 22. Thereby a torque is created acting in a direction opposite to that of rotation of the clutch, said torque being transmitted to bolts 3, 3 by means of toothed wheel 18 and toothed segments 17 causing the swinging arms 6, 6 to be drawn in towards the centre of the shafts out of engagement with the powder, whereby the clutch is disengaged. If shaft 15 is to be started again, lever 22 is returned to starting position whereby bolts 3, 3 and blades 8, 8 are released and the clutch is thrown in in the manner above described.

In the embodiment shown in Figs. 4 to 6, inclusive, flange 1 is formed integral with a toothed wheel 25. Engaging said toothed wheel 25 is a pair of toothed wheels 26, 26 secured to pins 27, 27 turnably journalled in an inwardly projecting flange 33 of casing 12. The toothed wheels 26, 26 are also in mesh with a toothed drum 28 secured by means of screws 30 to a flange 29 fixed to the driven shaft 15. In the embodiment previously described the casing is rigidly connected to the driven shaft but in this embodiment casing 12 is rotatably journalled on said shaft 15 and on the hub of toothed wheel 18 by means of the bearings 13, 13 as well as on the hub of toothed wheel 25 by means of a bearing 34.

As before, toothed segments 17, 17 secured to the bolts 3, 3 are in mesh with the toothed wheel 18 rotatably mounted on the driving shaft 4 (see Fig. 3) and formed integral with the brake drum 19. Casing 12 is rigidly connected or made in one piece with another brake drum 31. The braking bands 20 and 32 co-operating with said braking drums 19 and 31, respectively, are controlled by the common stretching device 21 and hand lever 22.

The swinging arms 6, 6 with their centrifugal weights 7 and blades 8 are constructed and arranged as shown and described with reference to the first embodiment (see Fig. 1).

On starting the driving shaft 4 flanges 1, 2 and toothed wheel 25 are set in rotation. At the beginning of the rotation the blades 8, 8 are retained in their position of rest on account of the tension of spring 9, whereas casing 12 will be rotated on account of wheels 26 engaging wheel 25 while rolling on drum 28. The latter and the shaft 15 to be driven are still at rest. At a given speed of rotation the centrifugal force overcomes the spring tension causing the blades 8 to move outwards into engagement with powder P. Thereby drifts are formed in front of the blades (see Fig. 1) causing a successive engagement between the blades and the casing. When complete locking of the casing is attained, the rotation of toothed wheels 26 will stop, and then shafts 4 and 15 will rotate at the same speed.

When it is desired to reverse the direction of rotation of shaft 15, the blades 8, 8 are first brought out of engagement with the powder P, this being effected by locking drum 19 against rotation as described with reference to the first embodiment. Reverse is then effected by stopping the rotation of casing 12 by locking drum 31 against rotation, shaft 15 being then rotated in opposite direction on account of toothed wheels 26 rotating toothed drum 28.

The drums 19 and 31 are locked against rotation by stretching brake bands 20 and 32, respectively, by means of hand lever 22 and stretching device 21. In Fig. 6 a simple arrangement is shown permitting simultaneous stretching of both the brake bands 20 and 32, said arrangement being self-explaining. It should be observed, however, that the stretching device 21 may also be so constructed that the braking action takes place in two stages.

Figs. 7 to 9, inclusive, illustrate another manner of effecting engagement and disengagement of the clutch and locking of the blades in different angular positions in order to permit variation of the slipping torque.

In this embodiment the driving element of the clutch comprises a hub 30 supporting the flanges 1, 2 which, as before, are connected with each other by the bolts 3, 3. No special centrifugal weights are shown in this embodiment. Journalled in bushes 31, 31 in the hub 30 is a shaft 32 carrying intermediate its ends a toothed wheel 33. Secured to said shaft 32 at each end thereof is a worm 34 meshing with a worm wheel 35 secured to each of the bolts 3, 3. Engaging toothed wheel 33 and axially movable along shaft 4, e. g. in the centre thereof, is a rack 36 connected by means of a pin 37 with a sleeve 38 which engages a slot 39 in shaft 4 so as to be axially displaceable along said shaft. A lever 40ª is turnably mounted at its lower end as at 41ª and pivotally connected to a fork 42ª or the like engaging a slot in the sleeve 38.

The driven half of the clutch is constructed substantially as in the first embodiment.

When the driving shaft 4 is started the swinging arms 6, 6 may occupy the position shown in Fig. 7 in which they are freely rotatable out of contact with powder P. When the shaft 15 to be driven is to be set in rotation, lever 40ª is turned in the direction of the arrow in Fig. 8 causing fork 42ª to move sleeve 38 along shaft 4. The sleeve 38 being rigidly connected to rack 36 brings with it said rack which movement is transmitted to bolts 3, 3 by toothed wheel 33 and worm gearings 34, 35. Thereby the bolts are turned through an angle corresponding to the displacement of lever 40ª causing blades 8, 8 to be brought into engagement with powder P whereby casing 12 and shaft 15 are rotated under corresponding slippage. The clutch is disengaged by returning lever 40ª into starting position.

The magnitude of the slipping torque is dependent on the angular position of the blades.

As in the embodiments previously described the swinging arms 6, 6 are turnable in opposite directions in order to facilitate their displacement.

Referring now to Figs. 10 to 12, inclusive, reference characters 4 and 15 designate, as before, the driving and the driven shafts, respectively. Axially movable on hub 30 is a sleeve 40 provided with two diametrically opposed lugs 41. The bolts 3, 3 are journalled in the flanges 1, 2 of hub 30 and in said lugs 41, the portion 42 of the bolts between said flanges being increased in diameter so as to prevent lateral movement of the bolts. As before, the bolts are each provided with a swinging arm 6 formed at its free end as a blade 8.

The bolts 3, 3 are each provided with a curved slot 44 extending diametrically through same and serving as guide for a pin 43 secured at its ends to the corresponding lug 41. The angle of rotation of the pin 43 between its two outermost positions in slot 44 corresponds to the greatest angle through which the blades may be swung outwards from their position of rest. The axial displacement of sleeve 40 along hub 30 is effected by a fork 47 or the like engaging a slot in a flange 48 of sleeve 40, said fork being operated in known manner.

As before, reference character 12 designates the casing or drum surrounding the blades 8, 8 and enclosing a mass of powder or loose material P. The shaft 15 to be driven is provided with an extension 45 journalled in a bush 46 in hub 30.

With the clutch at rest the blades 8, 8 occupy the position shown in the lower half of Figs. 10 and 11, the sleeve 40 taking up its outermost right position and the pins 43 abutting against the right limiting surface of the slots 44, all seen in Fig. 10. When the driving shaft 4 is started, this will have no influence on the driven part of the clutch, until sleeve 40 is moved inwards, i. e. to the left in Fig. 10, by operating the controlling means 47, 48. On account of the engagement of pins 43 in slots 44 the blades 8, 8 will be turned outwards and brought into engagement with powder P.

The magnitude of the slipping torque depends on the angular position of the blades, i. e. of the angle through which the blades are turned outwards, and as this angle may be varied as desired, the slipping torque may be given any desired value.

According to Fig. 13 the flanges 1, 2 on their bearing surfaces against portion 42 of bolts 3, 3 are shaped to form one or more edges 49 and further the bolts 3, 3 are channelled or grooved on their bearing surfaces in the flanges 1, 2 as shown at 50. By this means security against grating of the clutch is attained and, moreover, the packing otherwise required between bolt and flange will become superfluous. Evidently the channels or grooves may also be provided on the bearing surfaces of the flanges and the edges on portion 42 in which case the corresponding surfaces of bolts and flanges, respectively, may be smooth. In carrying out my invention in practice a spiral spring or the like wound around the bolts may be used to effect the guiding edges between bolt and flange.

The invention is not limited to the embodiments described above and shown on the drawings but comprises all modifications falling under the scope of the following claims.

What I claim is:—

1. A clutch between relatively rotatable driving and driven parts, comprising a clutch element adapted to be connected to one of said parts and carrying a member angularly displaceable in a plane substantially perpendicular to the axis of rotation, another clutch element adapted to be connected to the other of said parts and forming a casing enclosing said member, a mass of solid loose material in said casing adapted, engaged by said member, to act as power transmitting means between said clutch elements, and manually operable means including a toothed gearing and a braking device to control the displacement of said member.

2. A clutch between relatively rotatable driving and driven parts, comprising a clutch element adapted to be connected to one of said parts and carrying a member angularly displaceable in a plane substantially perpendicular to the axis of rotation, another clutch element adapted to be connected to the other of said parts and forming a casing enclosing said member, a mass of solid loose material in said casing adapted, engaged by said member, to act as power transmitting means between said clutch elements, and manually operable means including a worm gearing to lock said member to its supporting clutch element in any position of displacement.

3. A clutch between relatively rotatable driving and driven parts, comprising a clutch element adapted to be connected to one of said parts and carrying a member angularly displaceable under the action of centrifugal force in a plane perpendicular to the axis of rotation, another clutch element adapted to be connected to the other of said parts and forming a casing enclosing said member, a mass of solid loose material in said casing adapted, engaged by said member, to act as power transmitting means between said clutch elements, and manually operable means to control the displacement of said member.

4. A clutch between relatively rotatable driving and driven parts, comprising a clutch element adapted to be connected to one of said parts and carrying a pair of members angularly displaceable in opposite directions in a plane substantially perpendicular to the axis of rotation, another clutch element adapted to be connected to the other of said parts and forming a casing enclosing said members, a mass of solid loose material in said casing adapted, when engaged by said members, to act as a power transmitting means between said clutch element, and manually operable means including a toothed gearing and a braking device adapted to control the displacement of said members.

5. A clutch between relatively rotatable driving and driven parts, comprising a primary clutch element adapted to be connected to one of said parts and carrying a pair of members angularly displaceable in opposite directions in a plane substantially perpendicular to the axis of rotation, a secondary clutch element adapted to be connected to the other of said parts and forming a casing enclosing said members, a mass of solid loose material in said casing adapted, when engaged by said members, to act as a power transmitting means between the clutch elements, a bolt extending in parallel to the axis of rotation and mounted to turn in the primary clutch element, transmission means between said bolt and the displaceable clutch members and adapted to convert the rotational movement of the former into a corresponding radial movement of the latter, and manually operable means including a braking device and adapted to turn said bolt so as thereby to displace the said members in a plane substantially perpendicular to the axis of rotation.

6. In a clutch construction according to claim 5, the additional feature of edge means adapted to journal the bolt in the primary clutch element.

CARL AUGUST RUDQVIST.